UNITED STATES PATENT OFFICE 2,160,932

CO-POLYMERS OF VINYLIDENE CHLORIDE

Ralph M. Wiley, Midland, Mich., assignor to The Dow Chemical Company, Midland, Mich., a corporation of Michigan No Drawing. Application February 1, 1937, Serial No. 123,479. Renewed January 24, 1939

8 Claims. (Cl. 260—80)

This invention relates to the co-polymerization of vinylidene chloride with a styrene compound, and to the product thereby obtained. The term "styrene compound" is herein understood to include styrene and homologs thereof, whether ring- or chain-substituted. Examples of such compounds are styrene, vinyl toluene, ethyl vinyl benzene, propenyl benzene, and iso-propenyl benzene, any of which may be employed in the practice of my invention.

Certain resins prepared from styrene and its homologs are known. Such products generally are reversible polymers, in that elevated temperatures cause depolymerization of the resins to substantially monomeric forms of the styrene compound. On the other hand, resins prepared from vinylidene chloride alone are irreversible, and cannot readily be molded under conditions applicable to the styrene resins. Vinylidene chloride resins, in addition to their lack of thermoplasticity, are almost entirely unaffected by many of the common organic solvents. The polymerization of vinylidene chloride occurs so rapidly under many conditions that it is difficult to control the nature of the final product.

It is among the objects of this invention to prepare resins from vinylidene chloride which are thermoplastic, and which have a greater solubility in organic solvents then the resins heretofore produced from this compound. Another object of the invention is to provide a process whereby resins, a major component of which is vinylidene chloride, may be prepared in such a manner as to yield a product having pre-determined physical properties. A further object of the invention is to provide a co-polymer of vinylidene with a styrene compound.

I have now found that the co-polymerization of vinylidene chloride and a styrene compound, suitably in the presence of a catalyst for the polymerization of styrene compounds, results in the formation of valuable resin-like masses. I have also found that, whereas vinylidene chloride alone ordinarily polymerizes very rapidly, the addition thereto of even small amounts of styrene results in a material decrease in the rate of polymerization. By virtue of this discovery I have found that it is possible substantially to control, not only the rate of polymerization of vinylidene chloride, but also the nature of the resulting product. In carrying out my invention, the desired proportions of vinylidene chloride and styrene are mixed together, a catalyst added thereto, and the reaction carried out by maintaining the mixture at suitable temperatures until the desired degree of co-polymerization has been obtained. Any remaining substantially monomeric material may then be recovered from the polymerized product, suitably by distillation, leaving the crude co-polymer as a residue. The crude polymerized mixture may, if desired, be purified by washing, bleaching, or other suitable operations and is then capable of being molded, rolled, extruded, or otherwise fabricated.

The new resins may be obtained in a variety of physical forms, e. g., as a powder, porous solid, or hard, bone-like material, depending upon the degree of completeness to which the reaction is carried and upon the amount of styrene compound polymerized therewith. The addition of relatively small amounts of styrene to vinylidene chloride results in the formation of thermoplastic resins. The greater the quantity of styrene compound present, the more brittle is the resin. Regardless of the physical form in which they are obtained, I have found that the new products possess relatively low softening points and exhibit desirable plasticity at their molding temperatures.

I have prepared resinous compositions of the present type from mixtures of vinylidene chloride and styrene containing up to 30 per cent by weight of styrene and have obtained as final product co-polymers containing up to 60 per cent by weight of co-polymerized styrene therein. While I prefer to limit the amount of co-polymerized styrene or styrene compound in the final resinous product to an amount not substantially greater than 50 per cent of the weight of the final mixture, and ordinarily greater than 2 per cent of the weight of co-polymers, co-polymers of styrene compounds and vinylidene chloride in all proportions are included within the purview of my invention.

In a preferred method of operation, I have mixed vinylidene chloride and styrene in ratios from about 2 to 30 parts by volume of the latter to about 70 to 98 parts by volume of the former, together with small amounts, ordinarily not in excess of about 3 per cent by weight of a catalyst mixture comprising at least one accelerating agent, such as oxygen, ozone, benzoyl peroxide, acetyl chloride, acetic anhydride, etc., and at least one metal-containing catalyst such as tetraethyl lead, nickel carbonyl, diethyl zinc, diethyl mercury, etc. This mixture is subjected to co-polymerization in a closed vessel at temperatures suitably in the range between 15° and 60° C., and preferably between 25° and 40° C., although higher temperatures may be employed without serious effect upon the final product. The reaction mixture is maintained at the desired temperature, and usually at a pressure not less than atmospheric pressure nor greater than the vapor pressure of reactants at such temperature, until the desired degree of reaction is obtained. The time required for reaction is dependent upon the proportion of reactants, the catalysts employed, the temperature of reaction, and the degree of polymerization desired, but under preferred conditions of operation does not ordinarily exceed 200 hours. Unpolymerized material is thereafter separated from the reacted mixture, by heating or by fractional solvent extraction, etc., and may be utilized in further runs. The co-polymers are recovered as a residue from the above separation step, and if desired may be purified, as by washing with a dilute aqueous or organic solvent solution of chlorine, nitric acid, etc., although this is not necesary. Such a step, if carried out, serves not only as a bleach but also removes to a large extent residual catalyst bodies present in the co-polymer, and in so doing increases the resistance of the co-polymer to thermal decomposition. After treating with such an acid wash the product is re-washed with a solvent such as hot water or alcohol to remove acid residues therefrom, and after drying is ready for fabrication.

The physical form of the product obtained is dependent upon the degree of completeness of the reaction and upon the amount of styrene compound employed. Thus, when 10 parts of a styrene compound is mixed with 90 parts of vinylidene chloride, and the heating step of the process described above is stopped only about 20 per cent of the reactants have been polymerized, the product is obtained as a white powder. If polymerization is interrupted when from 40–50 per cent reaction has occurred, the resin is isolated as a highly porous mass. A hard bone-like product is obtained when the polymerization is carried out substantially to completion. Products having the highly porous or bone-like structures may, if desired, be broken up or pulverized before molding. All of the above forms of polymers become rubbery or highly plastic when subjected to the heat ordinarily applied in molding operations, and after being cooled from such temperature exhibit remarkable toughness in nearly every instance.

The following examples illustrate certain ways in which the principle of my invention has been applied, but are not to be construed as limiting the invention:

Example 1

51.2 grams of a mixture consisting of 30 per cent by volume of monomeric styrene, 1 per cent of benzoyl peroxide, and 69 per cent of vinylidene chloride was allowed to stand at room temperature in a loosely stoppered container for several months. The product of co-polymerization, when dried, was 25.4 grams of a hard glassy thermoplastic resin. It contained approximately 40 per cent by weight of co-polymerized vinylidine chloride, as shown by the presence of 28.9 per cent combined chlorine according to chemical analysis. This co-polymer was soluble in acetone, but dissolved quite slowly. It was readily soluble in carbon tetrachloride.

Example 2

To 32 grams of a mixture consisting of 4 per cent by volume of monomeric styrene and 96 per cent of vinylidene chloride, which had been kept in monomeric form in the presence of one-half per cent by weight of phenol as an inhibitor, was added 0.5 per cent by weight of each of the following catalysts and accelerators for polymerization, benzoyl peroxide, tetraethyl lead, and chloracetyl chloride. The mixture was co-polymerized by holding at 50° C. for approximately 48 hours. 29.5 grams of a white, chalky co-polymer was obtained. This material softened and became plastic when heated to 193° C. When cooled to room temperature a very tough, amber-colored resin resulted.

Example 3

32 grams of a mixture comprising 6 per cent styrene and 94 per cent vinylidene chloride by volume was subjected to co-polymerization in the presence of 1.5 per cent of the catalyst mixture employed in Example 2. After three days at 50° C., 29.4 grams of a co-polymer having a softening point of 177° C. was obtained. This material also became very tough when cooled to room temperature.

Example 4

32 grams of a mixture comprising 8 per cent styrene and 92 per cent vinylidene chloride was co-polymerized in the presence of the same catalyst mixture employed in Example 2. After 5 days at 50° C., 19.5 grams of a co-polymer softening at 150° C. was obtained. This product was not as tough as those obtained in Examples 2 and 3.

The products from Examples 2, 3, and 4 were all considerably tougher than that of Example 1, and in general it may be stated that increased amounts of styrene result in a lower degree of toughness but a higher degree of thermoplasticity. All of the co-polymers of vinylidene chloride and styrene in the range of compositions disclosed in the foregoing examples have a greater solubility in organic solvents than have resins produced from vinylidene chloride alone. They are also more soluble than mixed resins produced by intimately grinding together polymerized vinylidene chloride and polymerized styrene in the proportions equivalent to the amounts of these materials present in the above co-polymers. The thermoplasticity of the co-polymeric materials is greater in every instance than that of vinylidene chloride resins alone and is also greater than that of mixed resins produced by intimately grinding together polymerized vinylidene chloride and polymerized styrene in the same ratios in which these materials exist in my co-polymers.

Co-polymeric bodies can be produced from vinylidene chloride and other styrene compounds, e. g., vinyl toluene, ethyl vinyl benzene, propenyl benzene, etc. These co-polymers are formed in the presence of the same catalysts as are applicable to styrene itself, and can be fabricated in the same manner as the styrene co-polymers herein-described.

Although I have pointed out above that the herein-described co-polymerization procedure is ordinarily carried out at atmospheric pressure, or at the vapor pressure of the materials at the reaction temperature, greater pressures may be applied. In such cases the reaction may be carried out, for example, in an inert atmosphere of nitrogen or other suitable gas, introduced into the reaction zone under increased pressures either prior to or during the heating process.

I have further discovered that the aforementioned new co-polymers may be converted by application of pressure at temperatures between about 80° and about 200° C. into translucent or nearly transparent resinous bodies. By incorporating a plasticizing agent in the co-polymer prior to molding, the preparation of such resinous bodies may be carried out at even lower temperatures. Suitable plasticizers are chlorinated diphenyloxide, butyl phthalate, naphthalene, chloro-naphthalene, triphenyl phosphate, tricresyl phosphate, pentachlorethane, or hexachlorethane.

Such resinous bodies are normally obtained in substantially colorless form, but may be dyed to any desired color or shade by incorporating pigments or dyes therewith. While the above resinous bodies have a high tensile strength immediately after preparation, it has been determined that the act of drawing, pressing, or otherwise stretching the same increases the tensile strength and toughness. In addition to the characteristics just mentioned, I have observed that these compositions are especially resistant to chemical attack by acids, bases, and oxidizing agents.

If desired, heat stabilizing agents such as methyl stearate, dichloro-methyl stearate, calcium stearate, etc., may be incorporated into the co-polymer product, either by including such material in the original reaction mixture prior to the polymerization or by adding the same to the preformed co-polymer. The addition of such materials greatly increases the resistance of the final product to thermal decomposition and to discoloration caused thereby.

Molded resins may be prepared from any of the above forms, and the molding process conveniently carried out at approximately the softening temperature of the resin concerned, generally between 80° and 170° C. The molding temperature chosen is preferably below the decomposition temperature of the particular resin concerned, the latter temperature being largely dependent upon the proportion of styrene compound present in the original reaction mixture, the amount of residual catalyst dispersed in the resin product, and the presence or absence of heat-stabilizing agents. In the molding operation the co-polymer, preferably in finely divided form, is heated in a die of usual type to the molding temperature, i. e. the softening temperature of the resin as specified above, after which a pressure between about 100 and 2000 pounds per square inch is applied momentarily, the die cooled, and the molded resin product promptly removed.

Filaments are produced by extruding the co-polymerized material through small orifices in a plate at the softening temperature of the resin and preferably between 110° and 150° C., into a cooling medium, and applying tension to the cooled extruded material so as to draw the same into the desired filaments. The step of extruding and drawing is essentially a stretching operation, and results in a filament of maximum toughness and high tensile strength. Filaments may be produced by extruding solutions of the vinylidene chloride-styrene compound co-polymer into a drying or coagulating medium. Such medium is ordinarily one which is miscible with the solvent employed but which is itself not a solvent for the co-polymer, or it may be a medium which by virtue of its temperature causes violatilization of the solvent.

In preparing molded articles from the new co-polymers, various fillers such as wood flour, asbestos fibers, cellulose fibers, or any finely divided inert material, may be conveniently added by mixing the finely divided inert material with the powdered co-polymer in the die, by rolling the filler with the co-polymer on masticating rolls, or, if desired, by incorporating the filler with the reaction mixture prior to the co-polymerization reaction.

The herein-described new co-polymers and the resinous bodies prepared therefrom have, among other, the following advantages: (1) they are substantially more soluble in common organic solvent than is polymerized vinylidene chloride; (2) they are substantially unaffected by most acids, bases, and oxidizing agents and may be useful as coating materials for the interior of chemical reactors; (3) they have in their stretched, e. g., drawn and extruded form, a high tensile strength and are very tough and resistant to fracture; (4) they have low molding and softening temperatures well below their thermal decomposition temperatures; (5) they are internally plasticized due to their co-polymeric structure and they exhibit a desirable degree of plasticity at their molding temperatures; (6) they are compatible with many plasticizing and heat stabilizing agents; (7) they may be molded, drawn, rolled, or extruded at relatively low pressure to form valuable plastic articles, filaments, threads, sheets, etc., which retain the characteristics of high tensile strength and toughness shown by the parent product; and (8) they may be obtained in a variety of useful forms. The disclosed process economically produces the above described improved products under moderate conditions of temperature and pressure.

Other modes of applying the principle of my invention may be employed instead of those explained, change being made as regards the material employed, provided the step or steps or the product recited in the following claims be thereby carried out or obtained.

I, therefore, particularly point out and distinctly claim as my invention:

1. The method which comprises reacting vinylidene chloride with a styrene compound selected from the group consisting of styrene, and homologs thereof whether ring- or chain-substituted to produce co-polymeric bodies containing between about 2 and about 60 per cent by weight of the said styrene compound co-polymerized with the vinylidene chloride.

2. In a process for preparing a plastic, the step which consists in reacting vinylidene chloride with styrene to produce polymeric bodies containing between about 2 and about 60 per cent by weight of styrene co-polymerized with the vinylidene chloride.

3. In a process for preparing a plastic body, the step which consists in warming a vinylidene chloride solution containing between about 2 and about 30 parts by weight of a styrene compound selected from the group consisting of styrene, and homologs thereof whether ring- or chain-substituted and between about 70 and about 98 parts by weight of vinylidene chloride to a temperature between about 15° and 60° C., in the presence of polymerization catalysts, to produce polymeric bodies containing between about 2 and about 60 per cent by weight of the said styrene compound co-polymerized with the vinylidene chloride.

4. In a process for preparing plastic bodies, the step which consists in warming a vinylidene chloride solution containing between about 2 and about 60 parts by weight of styrene and between about 70 and about 98 parts by weight of vinylidene chloride to a temperature between about 15° and 60° C., and in the presence of polymerization catalysts to produce polymeric bodies containing between about 2 and about 60 per cent by weight of the styrene co-polymerized with the vinylidene chloride.

5. In a process for preparing plastic bodies, the steps which consist in warming a vinylidene chloride solution containing between about 2 and about 30 parts by weight of styrene and between about 70 and about 98 parts by weight of vinylidene chloride to a temperature between about 15° and 60° C., and in the presence of polymerization catalysts to produce polymeric bodies containing between about 2 and about 60 per cent by weight of the styrene co-polymerized with the vinylidene, and thereafter distilling off unpolymerized materials from the reacted mixture.

6. A co-polymer of vinylidene chloride and a styrene compound selected from the group consisting of styrene and homologs thereof whether ring- or chain-substituted, the said co-polymer containing between about 2 and about 60 per cent by weight of the said styrene compound co-polymerized with the vinylidene chloride.

7. A co-polymer of styrene and vinylidene chloride, the said co-polymer containing between about 2 and about 60 per cent of styrene co-polymerized with the vinylidene chloride.

8. A plastic mass comprising a co-polymer of vinylidene chloride and styrene, the said co-polymer containing between about 2 and about 60 per cent of styrene co-polymerized with the vinylidene chloride.

RALPH M. WILEY.